May 18, 1965  R. W. NILES  3,183,601
GAUGE

Filed Oct. 19, 1962  2 Sheets-Sheet 1

INVENTOR.
RAYMOND W NILES
BY
Woodhams, Blanchard & Flynn
ATTORNEYS

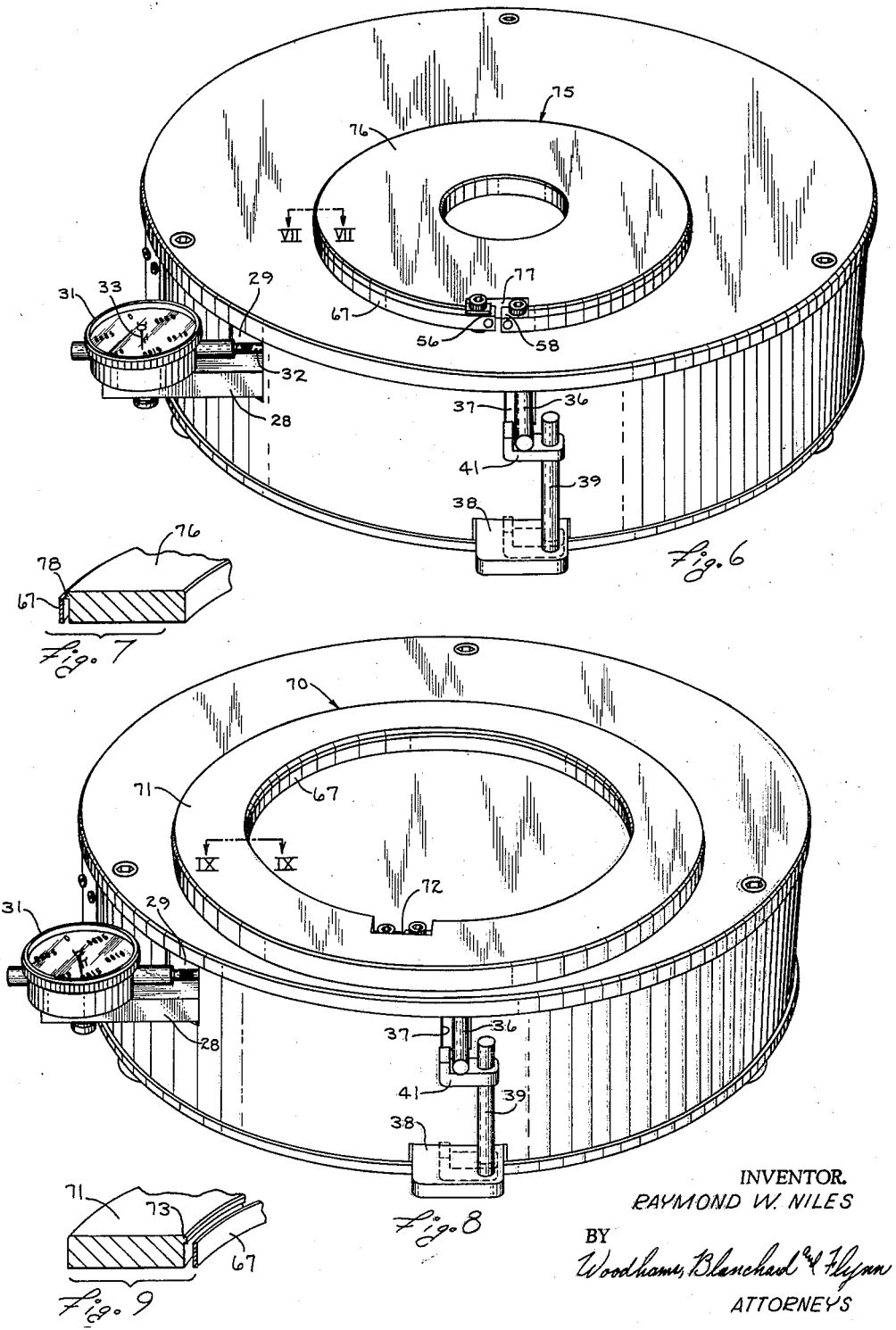

United States Patent Office 3,183,601
Patented May 18, 1965

3,183,601
GAUGE
Raymond W. Niles, Lakewood, Calif., assignor, by mesne assignments, to Walter E. Heller & Company (Inc.)
Filed Oct. 19, 1962, Ser. No. 231,695
9 Claims. (Cl. 33—179)

This invention relates to a precision gauge and, more particularly, relates to a gauge for precisely measuring the internal and/or external diameter of rings whose diameter-to-wall thickness ratio is relatively high, particularly rings of the afore-mentioned type which have a diameter in excess of several inches.

The problem which gave rise to the present invention involves measuring the diameter of thin-walled rings of large diameter, such as a diameter of three or more inches. Accordingly, the following description will make detailed reference to the afore-mentioned problem. However, it is to be understood that this is for illustrative purposes only and does not imply any limitation of the utility of the invention. Particularly, it does not preclude the use of this invention on thin-walled rings of small diameter under certain circumstances even though the primary utility of the invention remains with the larger rings.

The gauging of the internal and/or external diameter of thin-walled, large diameter rings has long been a troublesome problem. Such rings are used, for example, in extra-light-weight ball bearings for use in missile and space craft guidance systems wherein they may have a diameter-to-wall thickness ratio of 100:1 and they may have to be gauged with a repeatable accuracy of .00005 inch. The rings of such bearings are inherently flexible yet they must be accurately gauged for obvious reasons. While such rings can be accurately manufactured by suitable precision manufacturing techniques, they are very difficult to gauge accurately with known gauging devices because such devices cause distortion of the rings while the gauging operation is being performed and this makes it impossible to accurately measure the true dimensions thereof.

Gauging devices having contact loads of about one gram are commercially available. Yet, a force of one gram localized on the periphery of a thin-walled, large diameter, bearing ring will cause deflection or distortion thereof which may exceed the working tolerance for the ring being measured. Reducing the gauge contact load toward zero will not completely solve the gauging problem because thin-walled, large diameter rings also are susceptible to gravity induced deformation.

If a light-weight bearing ring is placed on a horizontal surface, it is almost certain to assume a slightly distorted form even though great care is taken in both its placement and its manner of support. Moreover, gravity induced friction between the bearing ring and the surface will prevent the ring from achieving a totally unrestrained state. Such distortions, though small, are often likely to be larger than the working tolerance for the ring.

Various techniques have been proposed for solving these problems. For example, vibration has been used in mechanical gauges to overcome the effect of such distortions. Further, optical methods are available for effecting a weightless gauging of parts of this type. While these techniques are useful, they still leave much to be desired, particularly as regards the ease of using the equipment involved and the expense of the equipment itself.

Accordingly, it is an object of this invention to provide an improved gauge which is particularly useful for precisely measuring the internal and/or external diameters of thin-walled, large diameter rings.

It is a further object of this invention to provide an improved gauge, as aforesaid, which will measure the diameters of rings having a diameter-to-wall thickness ratio of as high as 100:1, or even higher, to a repeatable accuracy of .00005 inch.

It is a further object of this invention to provide an improved gauge, as aforesaid, whose operation is almost completely immune to the effects of ambient temperature.

It is a further object of this invention to provide an improved gauge, as aforesaid, which is relatively simple in its construction as compared with prior art gauges intended for the same purpose and which is relatively inexpensive to manufacture and to maintain in operating condition.

It is a further object of this invention to provide an improved gauge, as aforesaid, which is relatively simple to operate and which is almost entirely insensitive to elastic deformations of the workpiece.

Other objects and advantages of the invention will become apparent to persons acquainted with equipment of this type on reading the following disclosure and inspecting the accompanying drawings.

In the drawings:

FIGURE 4 is a fragmentary, sectional view taken along the line IV—IV of FIGURE 3a.

FIGURE 6 is a perspective view of the apparatus and showing one type of pilot fixture mounted thereon.

FIGURE 7 is a sectional view taken along the line VII—VII of FIGURE 6.

FIGURE 8 is a perspective view similar to FIGURE 6 but showing another type of pilot fixture.

FIGURE 9 is a sectional view taken along the line IX—IX of FIGURE 8.

*General description*

Figure 1:
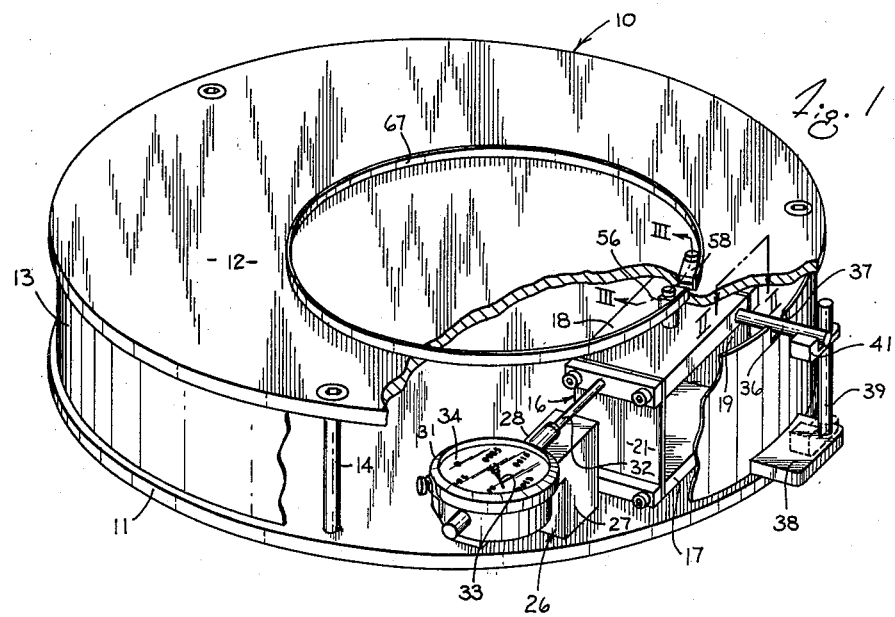
FIGURE 1 is a partially broken away, perspective view of a gauge constructed according to the invention.

The invention provides a gauge for measuring the internal and/or external diameters of objects, such as thin-walled, large diameter bearing rings, and it comprises a platen having a surface for supporting the object to be measured. A thin, hardened-steel, smooth-surfaced, flexible tape is arranged in the form of a substantially circular loop. One end of the tape is connected to a mounting block which is stationarily mounted on the platen and the other end of the tape is connected to a second mounting block which is mounted for movement with respect to the platen. The second mounting block is supported on a platform and said platform in turn is supported for movement in a direction substantially parallel with the platen whereby the second mounting block can be moved toward and away from the first mounting block. An indicator, which includes a suitably graduated dial face and a pointer, has operating means engageable with the platform so that movement of the second mounting block toward or away from the first mounting block effects movement of the pointer. Since the distance between the mounting blocks depends upon the circumference of the object being measured, the setting of the pointer will supply information as to the internal and/or external diameter of the object being measured.

*Detailed description*

The gauge 10 to which the invention relates is comprised of a circular base plate 11 on which the circular gauge platen 12 is fixedly mounted by a plurality of circumferentially spaced posts, one of which is indicated at 14. The platen 12 is parallel with and is spaced upwardly from the base plate 11. An annular side plate 13 extends between the plate 11 and the platen 12 to protect the parts located therebeween.

A reed parallelogram 16 is mounted on the upper surface of the base plate 11 and extends upwardly therefrom. The reed parallelogram 16 is comprised of a rectangular base block 17 which is fixedly mounted on the base plate 11 and a rectangular platform 18 which is of substantially the same size as the base block 17 and is positioned directly above the base block 17 and parallel therewith. The platform 18 is also disposed below and in close proximity to the lower surface of the platen 12. At least two parallel, flexible, resilient, sheet-form members, or reeds, 19 and 21 are secured to and extend between the block 17 and the platform 18 at the opposite ends thereof. The sheet-form members 19 and 21 normally support the platform 18 substantially parallel with and directly above the block 17 but they can resiliently flex to permit said platform to reciprocate with respect to said base block on a line perpendicular to the planes of the reeds 19 and 21. The base block 17 is positioned on the base plate 11 so that such reciprocation will be primarily in a chordal direction with respect to said circular platen 12.

A substantially L-shaped mounting block 26 has a vertical leg 27 fixedly mounted upon and extending upwardly from the upper surface of base plate 11 and a horizontal leg 28 extending through a slot 29 (FIGURES 6 and 8) in the side plate 13 substantially parallel with said base plate. An indicator 31 is mounted on the leg 28 and is located outside of the side plate 13. The indicator 31 has an operating plunger 32 which extends parallel with the leg 28 and which engages the end of the platform 18 substantially at the center thereof. The indicator 31 is of known type in which the plunger 32 is connected through suitable linkage (not shown) to a pointer 33 which is associated with a dial 34. Thus, lengthwise movement of the plunger 32 is effective to cause pivotal movement of the pointer 33 with respect to the dial 34. The linkage, or gear train, between the plunger 32 and the pointer 33 may be selected to establish a desired relationship between movement of the plunger and movement of the pointer. By suitable calibration of the dial 34, the instrument may be caused to read in any desired terms, usually diameter and/or circumference of the parts to be measured.

The operating lever 36 is mounted rigidly on the platform 18 and extends radially therefrom through a slot 37 in the side plate 13. A latch support plate 38 is mounted rigidly on the base plate 11 and extends outwardly through the side plate 13 substantially parallel with the operating lever 36. An upstanding post 39 is rigidly supported on the plate 38 and it has a hook-shaped limiter 41 mounted thereon for vertically slidable adjustment with respect thereto. The limiter 41 is engageable with the operating lever 36 to limit movement thereof away from the post 39 and thereby limit corresponding movement of the platform 18 with respect to the base block 17. Latch 41 normally reposes on plate 38 as shown in broken lines and is used only when work parts are heavy and require both hands for manipulation. The latch then holds the gauge in open position as shown to receive or to remove the workpiece.

Figure 2:
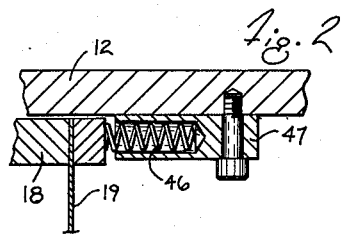
FIGURE 2 is a fragmentary, sectional view taken along the line II—II of FIGURE 1.

Suitable means may, if desired, be provided to continuously urge the platform 18 toward the indicator 31. While a variety of arrangements can be used for this purpose, including the resilience of the reeds 19 and 21, here a coil spring 46 (FIGURE 2) is shown disposed within a spring cage 47 which is secured to the lower surface of the platen 12. Said spring 46 bears continuously against the platform 18 and urges same toward the indicator 31. If, as is usually the case, a spring is provided within the indicator 31 to urge the plunger 32 outwardly, the coil spring 46 must have sufficient strength to overcome the spring urging the plunger 32 outwardly and provide an additional force to urge the platform 18 toward the indicator. However, in the more usual embodiments, the reeds 19 and 21 supply all of the force needed so that the spring 46 is unnecessary and may be omitted. In any event, the resultant force by which the platform 18 is urged toward the indicator 31 should be sufficient to insure that the tape will conform to the work surface, such as about five ounces. Thus, the indicator reaction is small by comparison and friction, hysteresis and similar variables will have negligible effect because percentage-wise, the substantially constant urging force is large compared to such random losses.

The platen 12 has a pair of spaced, threaded openings 51 and 52 (FIGURES 3 and 3a) in its upper surface, and above the platform 18. A slot 53 arranged parallel to the line of reciprocation of platform 18, is provided through the platen 12 and is located between the threaded openings 51 and 52. The platform 18 has a threaded opening 54 in its upper surface and said opening is aligned with the slot 53 in the platen 12.

Figure 3:
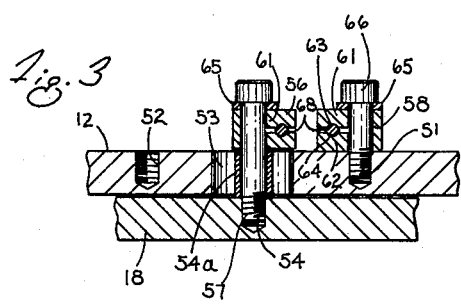
FIGURE 3 is a fragmentary, sectional view taken along the line III—III of FIGURE 1.
Figure 3A:
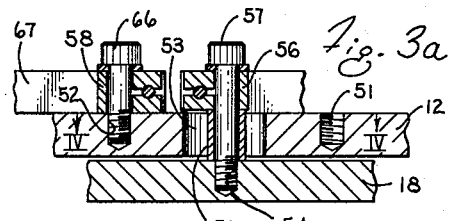
FIGURE 3a is a fragmentary, sectional view corresponding to FIGURE 3, but showing the parts in a different position.
Figure 4:
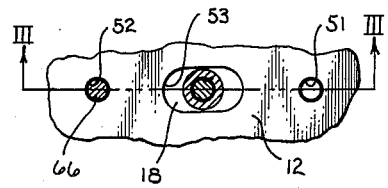

A movable tape mounting block 56 is disposed above the platen 12 and it has a mounting post 57 which extends through the slot 53 and which is threaded into the opening 54 in the platform 18. A spacer 54a surrounds the post 57 and extends slightly above the upper surface of plate 12. This insures clearance between block 56 and plate 12. Thus, mounting block 56 is mounted for movement with the platform 18. A fixed, tape mounting block 58 is provided and this block has a screw 66 which can be threaded into either opening 51 or opening 52. When the gauge 10 is to be used for measuring the internal diameter of a ring, the block 58 is mounted in the opening 51 as shown in FIGURE 3 and when the gauge 10 is to be used for measuring the external diameter of a ring, the block 58 is mounted in the opening 52 as shown in FIGURE 3a. Thus, mounting block 56 is urged away from the mounting block 58 when the internal diameter of the object is to be measured and said mounting block 56 is urged toward the mounting block 58 when the external diameter of the object is to be measured.

The blocks 56 and 58 are identical and each has a pair of parallel legs 61 and 62 which have aligned, opposed grooves 63 and 64 therein. Washers 65 rest on the upper legs 61 and they are held thereagainst by the heads of the screw 66 and the post 57 when same are threaded tightly into the platen 12 and platform 18, respectively.

Figure 5:
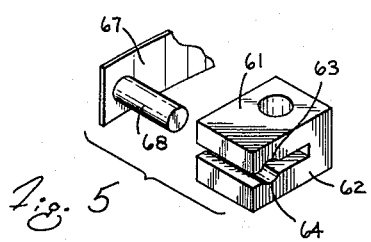
FIGURE 5 is a perspective view illustrating the manner in which the tape is connected to a mounting block.

A thin, smooth-surfaced, hardened-steel, flexible tape 67 is arranged substantially in the shape of a loop, usually circular, and it has a pair of pins 68 secured thereto adjacent its respective ends. As shown in FIGURE 5, the pins 68 are slidably receivable into the opposed grooves 63 and 64 in the mounting blocks 56 and 58 and are tightly clamped therein by the flexing of the legs of blocks 56 and 58 when screw 66 and post 57 are threaded into platen 12 and platform 18, respectively. Thus, movement of the block 56 toward and away from block 58 contracts and expands, respectively, the loop of tape 67. The sum of the distance between the fixed mounting block 58 and the movable block 56 and the length of the tape 67 itself corresponds to the periphery of the zone enclosed by the tape. Since the length of the tape is fixed, it is apparent that the distance between the blocks 56 and 58 provides an indication of the length of the inside or outside wall being measured.

Operation of the gauge 10 is facilitated if means are provided for piloting the workpiece to be measured while it is being placed inside of or outside of the tape 67. A suitable piloting fixture 70 for a workpiece whose external diameter is to be measured is shown in FIGURE 8. This fixture comprises a relatively thick-walled annulus 71 having a notch 72 in its inner edge for receiving the blocks 56 and 58. The inner edge of the annulus 71 has an inwardly projecting shoulder 73 (FIGURE 9) at its upper end and the tape can be expanded so that it snugly engages the inner edge of the annulus and is disposed below the shoulder 73 while the workpiece is being placed thereinto. A piloting fixture 75 for a workpiece whose internal diameter is to be measured is shown in FIGURE 6 and it comprises a ring 76 having a notch 77 for receiving the blocks 56 and 58 and having an outwardly extending shoulder 78 (FIGURE 7) at the upper end of the outer edge thereof. Inasmuch as the radial location of the blocks 56 and 58 does not change, the pilot rings will be more or less eccentrically located on the platen 12 depending on their own diameters as compared to the diameter of the platen.

It will be observed that the sheet-form members 19 and 21 extend substantially parallel with and are disposed on opposite sides of a diameter of the circular zone enclosed by the tape 67, which diameter passes through the space between the ends of the mounting blocks 56 and 58. It will further be observed that the plunger 32 is substantially aligned with the movable mounting block 56 so that it will be moved the same distance as the mounting block 56 moves with respect to the fixed mounting block 58.

Operation

While the operation of the gauge 10 has been indicated before, the same will be reviewed to insure a complete understanding of the invention.

In order to compare the internal or external diameter of a series of workpieces of a given size, the indicator must first be given a zero setting corresponding to the given size. This is done by placing a gauge ring or other suitable master of known size on the platen 12 and moving the tape 67 into snug engagement therewith and observing the position of the pointer 33. With the size of the master being known, the indicator can be adjusted in a known fashion, if necessary, so that the pointer thereof will indicate a desired point, such as zero, on the dial 34 when a workpiece of exactly the desired size is measured.

Assuming that the internal diameter of a workpiece is to be measured, the tape mounting blocks 56 and 58 will be mounted as shown in FIGURE 3. The ring 76 is then placed on the platen 12 and the block 56 is moved toward block 58 so that the tape 67 snugly engages said ring and is received under shoulder 78. Such movement of block 56 is effected by manually grasping the operating lever 36 and the post 39 by the fingers of one hand and urging the lever 36 against the resiliency of the reeds 19 and 21 (and also against the spring 46 if same is used) toward the post 39 and into the position shown in the drawings. This opens the gauge for application thereto of a workpiece. If desired, the latch 41 may be lifted into place as shown in solid lines in FIGURES 1, 6 and 8 to hold said lever in said position and thereby leave both hands of the operator free for loading. This use of the latch will, however, normally be desirable only in those cases where the parts being gauged are too heavy to be handled conveniently by one hand. The workpiece is then placed on the platen surrounding the ring 76. The latch 41, if used, is now released and the reeds 19 and 21 urge the platform 18 toward the indicator 31 and thereby move the movable block 56 away from the fixed block 58 which, in turn expands the tape into snug engagement with the internal surface of the workpiece. Since the platform 18 engages the operating plunger 32 of the indicator, movement of said platform will act through said plunger to move the pointer 33 of the indicator.

When the above-mentioned engagement of the tape occurs, movement of the block 56 is stopped and the corresponding movement of the platform 18 is likewise stopped. Since the pointer of the indicator indicates zero when the block 56 is in a position corresponding to the correct size of the workpiece, said pointer will indicate on the dial by how much the internal diameter of a particular workpiece being examined is undersize or oversize.

In principle, the tape 67 measures the circumference of the workpiece but the indicator, in most usages, converts the measured circumference into the diameter of the equivalent perfect circle. It is this equivalent or effective diameter that is important to the correct mounting fit of a thin-walled, large-diameter precision bearing. The flexibility of the bearing allows it to completely conform to the shape of the surfaces of the shaft and housing in which it is to be mounted even though these may not be perfectly circular. Yet, the fit must be precisely maintained and this is determined by the diameter of the equivalent perfect circle.

It will be apparent that by mounting the movable and fixed blocks 56 and 58 as shown in FIGURE 3a and using the annulus 71 in place of the ring 76, the gauge 10 can be used to measure the external diameter of the workpiece in similar fashion.

Experience has shown that the gauge 10 is almost completely, and quickly, self-compensating for the effects of ambient temperature. The smooth tape 67 is urged into intimate contact with the mutually smooth surface on the workpiece. Thus, conditions are ideal for a rapid transfer of heat in whichever direction will equalize the temperature difference between the two surfaces. Also, because of its low thermal capacity, the tape requires very little exchange of heat to accomplish complete temperature equalization. This means that the tape quickly and accurately adjusts its temperature to the temperature of the workpiece which it encircles. The framework of the remainder of the gauge 10 is outside of the measuring loop of the system so that its temperature has little effect on measuring accuracy.

For precision ball-bearing measurements, a steel tape has a temperature coefficient of linear expansion which, for practical purposes, is identical with material from which the bearing rings are made. The tape is the only part of the gauge which has a major function in sensing workpiece dimensions. Since it quickly compensates for temperature differences, workpieces which differ by several degrees in temperature can be measured in sequence with negligible error.

The gauge described was developed for the primary purpose of measuring large rings too thin and flexible to be accurately gauged by any other method. However, the gauge is also adapted to the coding of bearings used in ultra-precise selective assemblies. For this latter purpose, the gauge has the unique advantage of providing a single number output which indicates the size of the equivalent perfect circle even when the part is confusingly out of round.

While a particular preferred embodiment of the invention has been described, the invention contemplates such changes and modifications therein as lie within the scope of the appended claims.

What is claimed is:

1. A gauge for measuring the length of an endless, arcuate wall, comprising:
    a platen having a surface for supporting the object to be measured, said platen having an elongated slot therethrough;
    a first mounting means stationarily mounted on said platen and projecting above said surface;
    a second mounting means projecting upwardly through said slot, said second mounting means being adjacent and opposed to said first mounting means and being movable along said slot toward and away from said first mounting means;
    an indicator and operating means for said indicator, said operating means being responsive to movement of said second mounting means along said slot so that movement of said mounting means toward and away from each other effects operation of said indicator;

a flexible tape connected at its ends to both said mounting means and arranged in the form of a loop having an opening between said mounting means;

and means for moving said second mounting means with respect to said platen.

2. A gauge for measuring the internal or external diameters of objects, comprising:

a platen having a surface for supporting the object to be measured, said platen having an elongated slot therethrough;

a first mounting means stationarily mounted on said platen and projecting above said surface;

a platform supported adjacent the underside of said platen for movement substantially parallel therewith in a direction toward and away from said first mounting means;

a second mounting means mounted on said platform, said second mounting means projecting upwardly through said slot, the upper end of said second mounting means being adjacent and opposed to said first mounting means and being movable with said platform and along said slot toward and away from said first mounting means;

an indicator and operating means for said indicator, said operating means being responsive to movement of said platform so that movement of said mounting means toward and away from each other effects operation of said indicator;

a flexible tape connected at its ends to both said mounting means and arranged in the form of a loop having an opening between said mounting means;

and means for moving said platform with respect to said platen.

3. A gauge according to claim 2, including:

a base, said platen being fixedly mounted on and being spaced upwardly from said base, said platform being disposed between said platen and said base and being substantially parallel therewith;

and a pair of parallel, flexible, sheet-form members mounted at their lower ends on said base and extending upwardly therefrom, the upper ends of said members being connected to said platform and defining with said base and said platform a reed parallelogram whereby said platform is movable substantially tangentially with respect to said loop.

4. A gauge according to claim 3, in which:

said indicator is mounted on said base and said operating means is a plunger which extends substantially tangentially with respect to said loop and which engages one end of said platform.

5. A gauge according to claim 4 including:

a lock element secured to said platform and movable therewith;

latch means fixed with respect to said platen for engaging said lock element to prevent movement of said platform with respect to said platen;

and said means for moving said platform with respect to said platen comprises constantly-acting resilient means.

6. A gauge for measuring the internal and external diameters of objects, comprising:

a horizontal base plate;

a horizontal platen mounted on and supported a fixed distnace above said base plate, said platen having a smooth, planar upper surface, said platen having and elongated slot therethrough;

a horizontal platform disposed adjacent to an directly below said platen;

a pair of upright parallel, flexible, resilient, sheet-form members mounted at their lower ends upon said base and connected at their upper ends to the opposite ends of said platform;

an indicator mounted on said base and having an operating means engaging one end of said platform;

first and second relatively movable tape mounting blocks one of said blocks being mounted on said platen and the other being affixed to said platform, said other block projecting upwardly through said slot and being movable therealong, said blocks being disposed above said upper surface and being opposed to and spaced from each other a small distance;

a flexible tape connected at its ends to said mounting blocks and arranged in the form of a substantially circular loop having an opening between said mounting blocks, said tape being disposed so that said sheetform members extend substantially parallel with and are on opposite sides of a diameter of said loop which passes through said opening; and means for moving said platform with respect to said platen and said one mounting block.

7. A gauge for measuring the internal or external diameters of objects, comprising:

a platen having a surface for supporting the object to be measured;

a first mounting means stationarily mounted on said platen and projecting above said surface;

a platform supported adjacent said platen for movement substantially parallel therewith in a direction toward and away from said first mounting means;

a second mounting means mounted on said platform, said second mounting means being adjacent and opposed to said first mounting means and being movable with said platform toward and away from said first mounting means;

an indicator and operating means for said indicator, said operating means being responsive to movement of said platform so that movement of said mounting means toward and away from each other effects operation of said indicator;

a flexible tape connected at its ends to both said mounting means and arranged in the form of a loop having an opening between said mounting means;

means for moving said platform with respect to said platen; and a pair of pilot fixtures alternatively mountable upon said surface for piloting the object to be gauged with respect to said tape.

8. A gauge according to claim 7, in which:

said pilot fixtures are annular flat plates, one fixture having a radially inwardly projecting shoulder adjacent the upper end of its inner edge and the other fixture having a radially outwardly projecting shoulder adjacent the upper end of its outer edge, said tape being receivable under said shoulders while the object to be gauged is being placed in position.

9. A gauge for measuring the internal or external diameters of objects, comprising:

a platen having a surface for supporting the object to be measured, said platen having a slot therethrough;

a first mounting means stationarily mounted on said platen and projecting above said surface;

a platform supported adjacent said platen for movement substantially parallel therewith in a direction toward and away from said first mounting means;

a second mounting means mounted on said platform and extending through said slot so that its movement with respect to said first mounting means is guided thereby, said second mounting means being adjacent and opposed to said first mounting means and being movable with said platform and along said slot toward and away from said first mounting means;

said platen having a mounting opening adjacent each end of said slot into which said first mounting means is alternatively receivable;

an indicator and operating means for said indicator, said operating means being responsive to movement of said platform so that movement of said mounting means toward and away from each other effects operation of said indicator;

a flexible tape connected at its ends to both said mounting means and arranged in the form of a loop having an opening between said mounting means; and means for moving said platform with respect to said platen.

References Cited by the Examiner

UNITED STATES PATENTS 2,772,481  12/56  Grobey _____ 33—147
2,895,226   7/59  Coy _____ 33—179

ISAAC LISANN, *Primary Examiner.*